Figure 1:
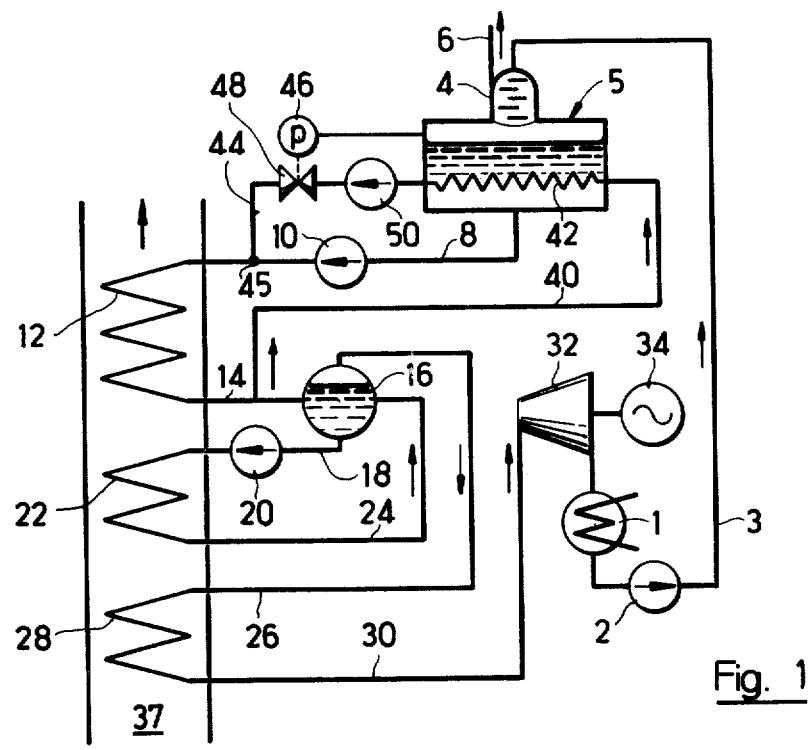

United States Patent [19]

Steinegger

[11] Patent Number: 4,465,027

[45] Date of Patent: Aug. 14, 1984

[54] EXHAUST GAS VAPOR GENERATOR

[75] Inventor: Hans-Rudolf Steinegger, Schaffhausen, Switzerland

[73] Assignee: Sulzer Brothers Limited, Winterthur, Switzerland

[21] Appl. No.: 475,738

[22] Filed: Mar. 16, 1983

[30] Foreign Application Priority Data

Mar. 31, 1982 [CH] Switzerland .................... 1973/82

[51] Int. Cl.³ .................................. F22D 7/00
[52] U.S. Cl. ..................... 122/406 S; 60/39.182; 122/441; 122/451 R
[58] Field of Search ............... 122/1 R, 7 R, 406 R, 122/406 S, 406 ST, 412, 414, 420, 421, 448 R, 466, 468, 470, 488, 441, 451 R; 60/39.182

[56] References Cited

U.S. PATENT DOCUMENTS

| | | | |
|---|---|---|---|
| 3,255,735 | 6/1966 | Pacault et al. | 122/406 S |
| 3,313,111 | 4/1967 | Strohmeyer, Jr. | 122/406 ST |
| 3,756,023 | 9/1973 | Berman | 122/406 R |
| 4,207,842 | 6/1980 | Kehlhofer | 122/406 S |
| 4,290,390 | 9/1981 | Juzi | 122/406 S |

Primary Examiner—Edward G. Favors
Assistant Examiner—Steven E. Warner
Attorney, Agent, or Firm—Kenyon & Kenyon

[57] ABSTRACT

The exhaust gas vapor generator has a main working medium flow which passes via a feed pump and economizer into an evaporator. Working medium is bled off as a component flow between the economizer and evaporator in order to heat the degasser. The heat of the component flow may be supplied via a heat exchanger disposed within the degasser or by a heat exchange with the condensate line within a heat exchanger separate from the degasser.

The part-flow is returned to the main flow between the feed pump and the economizer.

8 Claims, 3 Drawing Figures

EXHAUST GAS VAPOR GENERATOR

This invention relates to an exhaust gas vapor generator. More particularly, this invention relates to an exhaust gas steam generator having a degasser.

Heretofore, various types of exhaust gas vapor generators have been known. In some cases, the generators have been constructed with a degasser, particularly, for use with a combined gas turbine and vapor power plant. In such cases, a main flow of working medium usually passes by way of the degasser as well as a feed pump and an economizer into an evaporator over which a heated exhaust gas flow passes. In such cases, the degasser has usually been heated with heat from an unexpanded portion of the working medium. For example, the heat supplied to the degasser has been provided by working medium which is circulated by a circulating pump through the degasser and a heat exchanger disposed in an end region of the heated exhaust gas flow.

However, one disadvantage of the known arrangement is that, in relation to the vapor output of the vapor generator, the heat exchanger receives considerably more heat during partial load than at full load. As a result, the pressure in the degasser rises to an excessive value. Hence, the degasser has to be dimensioned for these excessive pressures.

Accordingly, it is an object of the invention to provide an exhaust gas vapor generator with a degasser of relatively simple construction.

It is another object of the invention to reduce the cost of construction of a vapor generator having a degasser.

Briefly, the invention is directed to an exhaust gas vapor generator which includes a degasser for receiving a working medium, a feed pump for pumping a flow of working medium from the degasser and an exhaust gas duct for conveying a heated gas therethrough. In addition, an economizer is disposed in the exhaust gas duct and is connected to the feed pump for receiving a flow of the working medium for heat exchange with the heated gas in the duct. An evaporator is also disposed in the exhaust gas duct for receiving a flow of heated working medium from the economizer.

In accordance with the invention, a means is provided for bleeding off a part-flow of heated working medium from between the economizer and the evaporator. In addition, a contact heat exchange means is provided for transferring heat from the part-flow to the degasser and means are pvovided for returning the part-flow to the working medium flow between the feed pump and economizer.

The construction is such that the waste gas heat used to heat the degasser and the main flow entering the degasser is provided by the working medium (e.g. feed water) coming from the economizer. To this end, the pressure of the working medium is such that, under normal circulation conditions, the working medium does not evaporate in the economizer.

One particular advantage of the exhaust (or waste) gas vapor generator is that the construction is considerably simplified.

The vapor generator may also be provided with a water/vapor drum between the economizer and the evaporator to receive the flow of working medium as well as a circulating pump for circulating the working medium through the evaporator and the drum. In this case, the means for bleeding off the part-flow can be connected between the circulating pump and the evaporator. As a result, the need for a special circulating pump for the component flow and any associated drive, control and switching facilities becomes superfluous.

The contact heat exchange means may be constructed to include a heat exchange coil within the degasser. This obviates the need for a casing for a condensate preheater.

In another embodiment, the contact heat exchange means may include a heat exchanger disposed in series with the degasser relative to the part-flow. This permits the use of a commercially available condensate preheater for the heat exchanger.

The means for returning the part-flow may be provided with a restrictor which is responsive to the pressure in the degasser in order to throttle the part-flow in response to an increase in pressure. In this case, the restrictor prevents the pressure in the degasser from rising to the blow-off pressure of any safety valves used with the degasser. Thus, there is no loss of vapor nor evolution of noise due to any blow-off of the safety valves. Also, the safety valves can remain seal-tight.

The vapor generator may also be constructed with a by-pass line between the means for bleeding off the part flow and the economizer for delivering at least a portion of the part flow to the economizer. In addition, a control valve is provided in the bypass line to control the flow therethrough in dependence on the temperature of the working medium flowing from the economizer. This provides a very low cost way of obviating evaporation in the economizer.

Figure 2:
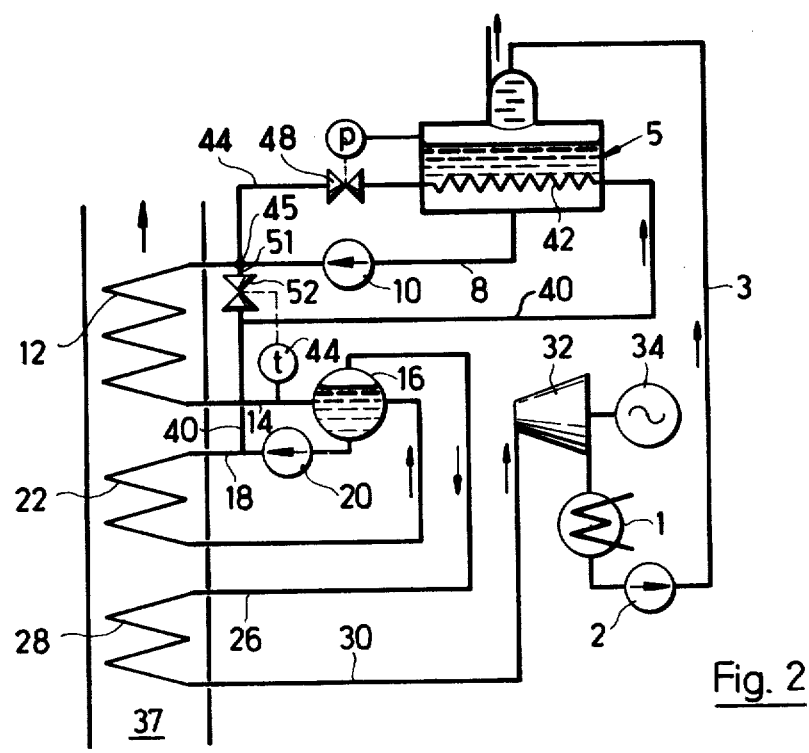
Figure 3:
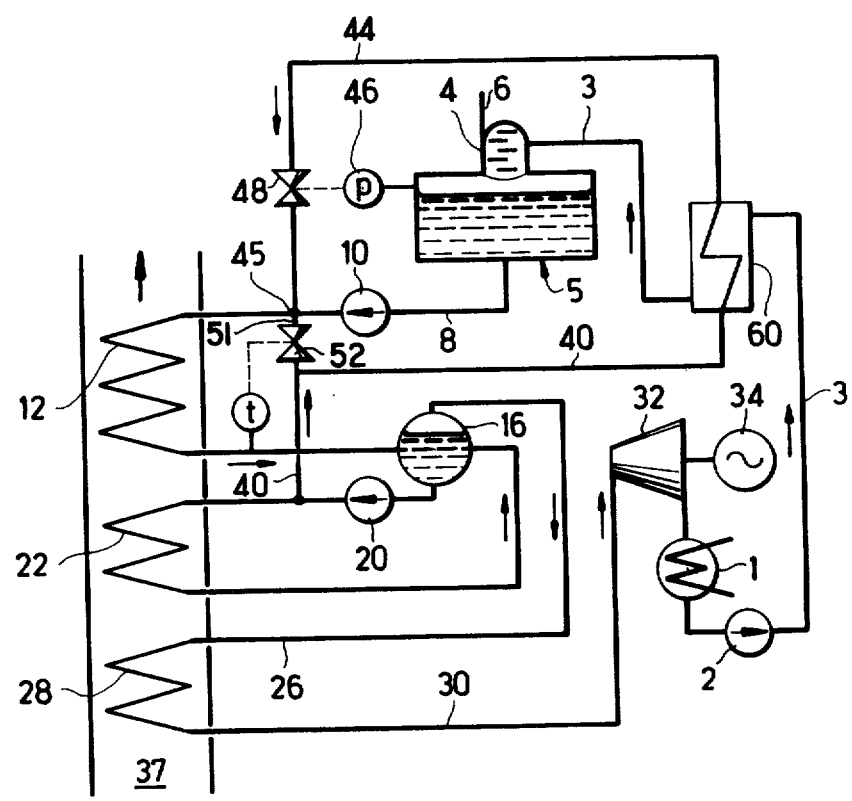

These and other objects and advantages of the invention will become more apparent from the following detailed description taken in conjunction with the accompanying drawings wherein:

FIG. 1 schematically illustrates a vapor generator constructed in accordance with the invention;

FIG. 2 illustrates a modified vapor generator having a means for bleeding off a part-flow connected between a circulating pump and the evaporator; and FIG. 3 illustrates a further modified vapor generator constructed in accordance with the invention with a bypass line between the means for bleeding off the part flow and the economizer.

Referring to FIG. 1, the exhaust gas vapor generator operates with a main flow of working medium which is in the form of a condensate contained within a condenser 1. As indicated, the condensate is pumped from the condenser 1 by a condensate pump 2 through a condensate line 3 into a cascade tower 4 of a degasser 5. This degasser also serves as a feed water tank for the exhaust (or waste) gas vapor generator.

The degasser 5 has a vent line 6 through which evolved gases may be discharged to the atmosphere. In addition, a feed line 8 is connected to the bottom of the tank 5 and communicates via a feed pump 10 with an economizer 12 disposed within an exhaust gas duct 37 through which a heated flue gas passes, such as the exhaust gases of a gas turbine set (not shown).

The economizer 12 is connected on the outlet side via a line 14 to a vapor/water drum 16. The drum 16 is, in turn, connected to a line 18 at the bottom which passes via a circulating pump 20 to an evaporator 22 within the exhaust gas duct 37 in order to deliver a flow of working medium thereto. An outlet of the evaporator 22 is connected via a line 24 back to the drum 16. As indicated, an upper portion of the drum 16 is connected via a line 26 to a superheater 28 which is located within the exhaust gas duct 37. This superheater 28 is, in turn, connected via a live steam line 30 to a steam turbine 32 which is coupled with an electric generator 34 and which is connected to the condensor 1.

As shown in FIG. 1, the superheater 28, evaporator 22 and economizer 12 are disposed in series within the exhaust duct 37 to sequentially receive the heated gas flow in heat exchange relation.

As shown in FIG. 1, a means for bleeding off a part-flow of the heated working medium is provided between the economizer 12 and the drum 16. This means includes a branch line 40 which is connected to the line 14 and which extends to a contact heat exchange means in the form of a heat exchange coil 42 within the bottom part of the degasser 5. This pipe coil 42 is positioned so as to transfer heat from the part-flow to the degasser 5. In addition, a means for returning the part-flow communicates the coil 42 with a position between the feed pump 10 and the economizer 12. As indicated, this means is in the form of a line 44 which passes from the pipe coil 42 to a location 45 in the feed pipe 8 between the pump 10 and the economizer 12. In addition, a circulating pump 50 is disposed in the line 44 while a restrictor 48 is disposed between the pump 50 and the location 45. This restrictor 48 is in the form of a throttle or restrictor valve which is responsive to a pressure detector 46 connected to the degasser 5. In this respect, the restrictor 48 is responsive to the pressure in the degasser 5 in order to throttle the part-flow in response to an increase in the pressure within the degasser 5.

During operation, cold condensate is injected through the condensate line 3 into the cascade tower 4 within the degasser 5. The condensate then trickles down over the cascade tower 4 and is heated to saturated steam temperature by condensing vapor whose origin will be described hereinafter. Any gases which evolve from the condensate are discharged to the atmosphere through the ventline 6 which is located in the tower 4.

The saturated-state water in the degasser 5 is at a pressure slightly above atmospheric pressure and is forced by the pump 10 into the economizer 12. The water is then heated to a little below the evaporation temperature. Next, this heated water flows through the line 14 into the drum 16. Some of the working medium is then circulated by the pump 20 through the evaporator 22 with the evolution of a mixture of water and vapor which then passes to the drum 16. In addition, working medium in the form of saturated steam is supplied to the superheater 28 from the drum 16 via the line 26 and is superheated therein. The superheated steam then passes through the live steam line 30 to the steam turbine 32 and is expanded therein. Thereafter, the expanded steam is condensed in the condenser 1.

During operation, a part-flow of feed water which has been heated in the economizer 12 is branched off via the branch line 40 to the pipe coil 42 in the degasser 5. Since the pipe coil 42 may experience relatively great temperature differences, the coil 42 can be made small. The water which is in the degasser 5 near the pipe coil 42 is thus evaporated and the corresponding vapor rises within the cascade tower 4. Most of this vapor condenses and, in so doing, heats the condensate which trickles down over the cascades. The minor portion of the vapor which is not condensed in the tower 4 exits together with the gases evolved from the condenate through the vent line 6. Of note, the vent line 6 may include a cooler for condensate recovery.

The pressure detector 46 and the restrictor valve 48 are so adjusted that when the pressure in the degasser exceeds a predetermined limit, the valve 48 restricts the quantity of working medium flowing through the pipe coil 42.

Referring to FIG. 2, wherein like reference characters indicate like parts as above, the branch line 40 may alternatively be connected not to the line 14 but to the line 18 between the pump 20 and the evaporator 22. In this way, the circulating pump 50 of the embodiment described in FIG. 1 can be omitted.

In addition, a bypass line 51 is provided between the line 40 and the feed line 8 in order to permit the part-flow to bypass the pipe coil 42 and restrictor 48. This permits a direct return of the working medium from the drum 16 to the ecomomizer 12.

As indicated, the bypass line 51 is provided with a bypass control valve 52 in order to control the flow therethrough. This control valve 52 is acted on by a temperature detector 54 in the line 14 so that, as the temperature of the working medium in the line 14 increases, the bypass valve 52 tends to close.

The feature of returning water of substantially saturated steam temperature to the economizer 12 increases the inlet temperature of the water to the economizer 12. Thus, the take-up of heat in the economizer is increased with the result that the economizer outlet temperature is stabilized. This control feature obviates the evaporation of water in the economizer 12 but has the disadvantage that the waste gas heat loss increases when the bypass valve 52 opens.

Referring to FIG. 3, wherein like reference characters indicate like parts as above, the contact heat exchange means for transferring heat from the part-flow to the degasser 5 may be in the form of a heat exchanger 60 which is separate from the degasser 5. As shown, this heat exchanger 60 is disposed in the condensate line 3 and is connected into the branch line 40 so as to permit a heat exchange between the heated primary part-flow in the branch line 40 and the secondary condensate in the line 3. As shown, the primary outlet of the heat exchanger 60 is connected to the line 44 containing the restrictor valve 48. A bypass line 51 with a control valve 52 therein is also provided between the branch line 40 and the feed line 8 as above.

During normal operation, the condensate is heated to the saturation point in the heat exchanger 60 with evaporation of a very small portion of the condensate. Thus, degassing starts right at the top story or stage of the cascades of the tower 4. Consequently, the tower 4 can be made smaller for a given degassing effect.

In all of the above described embodiments, a spray degasser can be used instead of a cascade degasser. Further, the embodiment of FIG. 1 is not limited to a forced circulation vapor generator but may also be used in forced-flow once-through vapor generators and for natural circulation vapor generators.

Further, the embodiments of FIGS. 2 and 3, can be combined if a heat exchanger 60 in the form of an evaporator is disposed in parallel to a pipe coil 42. Further, in the embodiment of FIG. 3, the heat exchanger 60 can be constructed so that condensate is not heated to saturation temperature. In this event, degassification can be effected, for instance, by an uncontrolled supply of vapor from the drum 16.

As compared with known vapor generators in which the condensate is preheated by bled steam, the vapor generator of the invention has the advantage of greater simplicity and of enabling a less expensive vapor turbine to be used. Further, the turbine has a higher performance due to the omission of vapor bleeds. A greater efficiency is also obtained as a result of a greater cooling of the flue gas.

The invention thus provides a vapor generator which is of relatively high efficiency but of relatively low cost to install. Thus, the invention permits the construction of very simple, operationally reliable and low cost plants.

What is claimed is:

1. In an exhaust gas vapor generator, the combination comprising a degasser for receiving a working medium;

a feed pump for pumping a flow of working medium from said degasser;

an exhaust gas duct for conveying a heated gas therethrough;

an economizer disposed in said exhaust gas duct and connected with said feed pump for receiving a flow of working medium therefrom for heat exchange with the heated gas in said duct;

an evaporator disposed in said exhaust gas duct for receiving a flow of heated working medium from said economizer;

means for bleeding off a part-flow of heated working medium from between said economizer and said evaporator;

a contact heat exchange means for transferring heat from said part-flow to said degasser; and means for returning said part-flow to said flow between said feed pump and economiser.

2. The combination as set forth in claim 1 which further comprises a water/vapor drum between said economizer and said evaporator to receive the flow of working medium passing therebetween and a circulating pump for circulating the working medium through said evaporator and said drum, said means for bleeding off the part-flow being connected between said circulating pump and said evaporator.

3. The combination as set forth in claim 1 wherein said contact heat exchange means includes a heat exchange coil disposed within said degasser.

4. The combination as set forth in claim 1 wherein said contact heat exchange means includes a heat exchanger disposed in series with said degasser relative to said part-flow.

5. The combination as set forth in claim 1 which further comprises a restrictor in said means for returning said part flow, said restrictor being responsive to the pressure in said degasser to throttle said part-flow in response to an increase in said pressure.

6. The combination as set forth in claim 1 which further comprises a bypass line connected between said means for bleeding off the part-flow and said economizer for delivering at least a portion of the part-flow to said economizer and a control valve in said bypass line to control the flow therethrough in dependence on the temperature of the working medium flowing from said economizer.

7. In an exhaust gas vapor generator, the combination comprising a degasser for receiving a working medium;

a feed pump for pumping a flow of working medium from said degasser;

an economizer connected with said feed pump for receiving a flow of working medium therefrom for heat exchange with a heated gas;

an evaporator for receiving a flow of heated working medium from said economizer;

means for bleeding off a part-flow of heated working medium from between said economizer and said evaporator;

a contact heat exchange means for transferring heat from said part-flow to the working medium delivered to said degasser; and means for returning said part-flow to said flow between said feed pump and economizer.

8. In an exhaust gas vapor generator, the combination comprising a condensate line;

a degasser for receiving a flow of working medium from said line;

an exhaust gas duct for conveying a heated gas therethrough;

an economizer disposed in said exhaust gas duct and connected with said degasser for receiving a flow of working medium therefrom for heat exchange with the heated gas in said duct;

an evaporator disposed in said exhaust gas duct for receiving a flow of heated working medium from said economizer.

means for bleeding off a part-flow of heated working medium from between said economizer and said evaporator;

a contact heat exchange means for transferring heat from said part flow to the working medium delivered to said degasser; and means for returning said part-flow to the flow of working medium between said degasser and said economizer.

* * * * *